United States Patent [19]

Tanno et al.

[11] 3,957,916

[45] May 18, 1976

[54] PROCESS FOR PREPARING A THERMOPLASTIC RESIN WITH PVC DISPERSED THEREIN

[75] Inventors: Seikichi Tanno; Hisashi Kohkame; Chikashi Kanno, all of Hitachi, Japan

[73] Assignee: Hitachi, Ltd., Japan

[22] Filed: Nov. 9, 1973

[21] Appl. No.: 414,302

[30] Foreign Application Priority Data

Nov. 10, 1972 Japan .......................... 47-112119

[52] U.S. Cl. .......................... 260/881; 260/29.6 RB; 260/29.6 WA; 260/876 R; 260/884; 260/885; 260/886

[51] Int. Cl.$^2$ .................. C08L 33/18; C08L 25/04; C08L 27/02; C08L 31/02

[58] Field of Search ........... 260/881, 884, 885, 886, 260/876 R

[56] References Cited

UNITED STATES PATENTS

| | | | |
|---|---|---|---|
| 3,334,156 | 7/1967 | Calentine et al. | 260/884 |
| 3,426,101 | 2/1969 | Ryan et al. | 260/876 |
| 3,657,172 | 4/1972 | Gallagher et al. | 260/29.6 RB |
| 3,660,529 | 5/1972 | Groch | 260/876 R |
| 3,673,283 | 6/1972 | Tanaka et al. | 260/898 |
| 3,697,620 | 10/1972 | Ermides | 260/836 |
| 3,760,035 | 9/1973 | Kelley | 260/876 |
| 3,832,318 | 8/1974 | Gallagher et al. | 260/884 |

*Primary Examiner*—Murray Tillman
*Assistant Examiner*—Thurman K. Page
*Attorney, Agent, or Firm*—Craig & Antonelli

[57] ABSTRACT

A process for preparing a thermoplastic resin composition comprises subjecting a cross-linked rubber obtained by copolymerization of an acrylic ester represented by the general formula $CH_2 = CHCOOR$, wherein R is an alkyl group having 2 to 8 carbon atoms, and a cross-linking agent to graft polymerization with a polymerizable vinyl or vinylidene monomer in the presence of polyvinyl chloride resin particles through radical polymerization. The present disclosure also relates to a process for preparing a mixed composition comprising the thermoplastic resin composition prepared above and a powder of polyvinyl chloride resin.

The thermoplastic resin composition has good weather-resistance properties and good mechanical properties. As the thermoplastic resin composition can easily be mixed with a polyvinyl chloride resin, a polyvinyl chloride resin composition having excellent properties is obtained by simple mixing operation.

47 Claims, No Drawings

PROCESS FOR PREPARING A THERMOPLASTIC RESIN WITH PVC DISPERSED THEREIN

The present invention relates to a process for preparing a thermoplastic resin composition comprising a novel, flame-resistant, impact-resistant graft copolymer composition excellent in weather-resistance.

Because of excellent tensile strength, rigidity, and weather-resistance, and low cost, thermoplastic resins such as styrene-acrylonitrile resin (AS resin), methacryl resin, methyl methacrylate-styrene resin (MS resin) have heretofore been widely used in general applications. However, these resins had such drawbacks that they were inferior to other thermoplastic resins in flame-resistance and impact-resistance.

Various processes have been proposed to improve these flame-resistance and impact-resistance.

First of all, there is a process in which halogenophosphorus compounds such as perchloropentacyclodecane, tris-(chloromonopropyne) phosphate, hexabromobenzene, tri-(chlorobromopropyl)phosphate and the like are used as flame-retarding agents and antimony trioxide or dicumyl peroxide is used as a flame-retarding adjuvant in order to improve the flame-resistance. However, this process using these compounds is not desirable because it is expensive and the mechanical properties of the product are deteriorated.

Secondly, in order to improve the impact-resistance, there is a process in which a rubber component is incorporated into these resins to form a graft polymer such as ABS resin (acrylonitrile-butadiene-styrene resin) or MBS resin (methyl methacrylate-butadiene-styrene resin). According to this process, the impact-resistance can be improved without impairing the inherent mechanical properties of AB resin, MS resin and methacrylate resin. However, the resulting resin comes to contain a rubber component having a double bond in the molecule and hence, the resin is susceptible to oxidization, and properties such as impact-resistance, elongation and the like are deteriorated by the influence of heat, sunlight, ultraviolet light and the like.

That is, said heretofore employed methods have not been suitable to obtain a resin composition having improved flame-resistance and impact-resistance and excellent weather-resistance.

The present inventors thought that by blending a rubber component having no double bond a vinyl chloride resin with various thermoplastic resins, such as As resin, MS resin, methacryl resin and the like, the impact-resistance and flame-resistance of the thermoplastic resins could be improved and the weather resistance thereof could simultaneously be enhanced. Based on this thought, the inventors selected a commercially available acrylic rubber as a weather-resistant rubber having no double bond and blended a resin composition obtained by grafting a vinyl monomer such as styrene, vinyltoluene, tertbutylstyrene, acrylonitrile, α-methylstyrene, methacrylic acid, methyl methacrylate or the like on the rubber, and a vinyl chloride resin with the said thermoplastic resin to find that the flame-resistance was improved but there was seen substantially no improvement in impact-resistance and, rather, the tensile strength and heat deformation temperature were greatly lowered. Therefore, the inventors have made a detailed examination of cross-linking agents for acrylic rubber, introduction of grafting sites and method of adding vinyl chloride resin, to achieve the present invention.

An object of the present invention is to provide a novel thermoplastic resin composition.

Another object of the present invention is to provide a thermoplastic resin composition excellent in flame-resistance, impact-resistance and weather-resistance.

A further object of the present invention is to provide a process for preparing such a novel resin composition.

Other objects and advantages of the present invention will become apparent from the following description.

According to the present invention, there is provided a process for preparing a thermoplastic resin composition excellent in flame-resistance, impact-resistance and weather-resistance, which comprises graft-copolymerizing, by radical polymerization, (B) at least one compound selected from the group consisting of polymerizable vinyl monomers and vinylidene monomers on (A) a cross-linked acrylic rubber obtained by copolymerization of an acrylate represented by the formula, $CH_2 = CH—COOR$, wherein R is an alkyl group having 2 to 8 carbon atoms and a cross-linking agent in the presence of a vinyl chloride resin latex or powder.

The starting materials employed in the process for preparing the thermoplastic resin composition of the present invention are explained hereinbelow. The mixing ratio of the components is preferably 10 to 90 parts by weight of (A) the cross-linked acrylic rubber and 90 to 10 parts by weight of (B) the polymerizable vinyl monomer and vinylidene monomer, provided that the total of the components (A) and (B) is 100 parts by weight, and (C) 20 to 70 parts by weight of the vinyl chloride resin. Where the amount of cross-linked acrylic rubber (A) is less than 10 parts by weight, the product is low in impact strength, and where the amount thereof is more than 90 parts by weight, the product as produced is soft and low in tensile strength. When hardened by blending with other resins, it is poor in blendability and low in impact-resistance. In the case of the component (B), the relation is inverse to the case of the component (A). When the amount of vinyl chloride is less than 20 parts by weight, the product is poor in flame-resistance and, if it is more than 70 parts by weight, impact-resistance is low.

All of the acrylates used in the present invention and represented by the general formula, $CH_2 = CHCOOR$, may be employed and, in particular, favorable results are obtained when ethyl acrylate and butyl acrylate are employed.

As to the cross-linking agents, various known cross-linking agents may be used, though particularly triacryl formal (hexahydro-s-triazine), triallyl isocyanurate and triallyl cyanurate give good results. The copolymer of acrylate ester and triacryl formal is described in, for example, U.S. patent application Ser. No. 287,720, entitled "Graft-Polymer Comprising Acrylic Rubber and Unsaturated Compound Grafted Thereto" filed Sept. 11, 1972, and now U.S. Pat. No. 3,859,383. The copolymer of acrylate ester and triacryl isocyanurate is disclosed in U.S. patent application Ser. No. 156,330, entitled "Process for Producing Thermoplastic Resin Highly Resistant to Impact and Weather" filed Nov. 14, 1972, now abandoned. The copolymer of acrylate ester and triallyl cyanurate is produced in substantially the same manner as disclosed in the above latter U.S. application. Further, such known cross-linking agents as dicyclopentadiene maleate esters and a series of ethylene glycol esters such as ethylene glycol dimethacrylate, diethylene glycol dimethacrylate, triethylene glycol dimethacrylate, tetraethylene glycol dimethacrylate, trimethylolethane trimethacrylate, tetramethylolpropane trimethacrylate, tetramethylolmethane tetramethacrylate, and the like are used in place of the above cross-linking agents. In producing the acrylate rubber, 0.2 to 10% by weight of a cross-linking agent is dissolved in the acrylate ester monomer. On the other hand, a polymerization initiator, an emulsifying agent and pH adjusting agent are dissolved in water with stirring to prepare an emulsion solution. Then the monomer solution is mixed with the emulsion solution. The polymerization is carried out with stirring at relatively high temperatures such as 60° to 80°C for several hours when normal polymerization initiator such as potassium persulfate is used, or at relatively low temperatures such as room temperature when a redox type polymerization initiator such as cumene hydroperoxide and ferrous sulfate is used.

As the aforesaid powdery vinyl chloride resin used in polymerization, there may be used conventional vinyl chloride resins synthesized by suspension polymerization or emulsion polymerization, though the resin powder with a small particle diameter is particularly desirable.

The vinyl monomers or vinylidene monomers forming the polymer include, for example, acrylonitrile, styrene, methyl methacrylate, $\alpha$-methylstyrene, vinyltoluene and the like.

The above-mentioned rubber composition may contain, in addition to said acrylates and cross-linking agents, other vinyl monomers in an amount within the range of from 5 to 30%.

The resin composition obtained by the above-mentioned method comprises a graft copolymer in which the vinyl monomer is grafted on the cross-linked acrylic rubber and the vinyl chloride resin particles substantially uniformly dispersed therein. Consequently, there can be obtained a mixed composition which is far more uniform than that obtained by mixing the vinyl chloride resin powder with a graft-copolymer prepared previously from the cross-linked acrylic rubber and a polymerizable vinyl monomer.

The resin composition comprising the aforesaid graft copolymer composition in accordance with the present invention may be used alone or in admixture with a vinyl chloride resin powder. When the rubber component is much, the composition may be blended with other thermoplastic resin such as AS resin, MS resin and the like, and used as an impact-resistance-improving agent.

Vinyl chloride resin is excellent in mechanical properties including tensile strength and is inexpensive, and hence, is widely used in general applications. However, vinyl chloride resin has the drawbacks that it is considerably degraded, disclored and reduced in mechanical properties at the extruding temperature of conventional plastics (at 200°C or higher) and that it adversely affects the properties of product even after extrusion. It has also the drawback that the impact strength thereof among the mechanical properties is lower than that of conventional thermoplastic resins. A variety of methods have heretofore been proposed to overcome these drawbacks. They are roughly classified into the following two groups: One of them is a method in which a plasticizer is added to the vinyl chloride resin and the other is a method in which a graft copolymer excellent in processability and impact-resistance such as acrylnitrile-butadiene-styrene resin (ABS resin), methyl methacrylate-butadiene-styrene resin (MBS resin) and the like is blended with the vinyl chloride resin to improve the properties thereof. However, the former method has the drawback that the product is markely inferior to vinyl chloride resin itself in heat deformation temperature, rigidity and tensile strength. On the other hand, according to the latter method, there is an advantage that impact strength and processability can be improved without so much impairing the excellent mechanical properties of the vinyl chloride resin. On the contrary, there is a drawback that ABS resin or MBS resin used has many double bonds in the molecular chain and is readily susceptible to oxidation under the influence of sun light, ultraviolet light and the like, and hence, the impact strength and elongation of the product are markedly reduced. There is another method in which polyethylene chloride or ethylene-vinyl acetate copolymer is blended with the vinyl chloride resin. However, according to this method, there is the defect that the product is readily discolored upon exposure to sun light or weather. There is a further method in which acrylic rubber-methyl methacrylate-acrylonitrile copolymer is blended with the vinyl chloride resin. According to this method, processability and impact-resistance can be improved. However, said copolymer has a defect that high impact-resistance cannot be obtained unless said copolymer is sufficiently kneaded with the vinyl chloride resins.

Vinyl chloride resin composition having excellent characteristics can be obtained more readily by incorporating the thermoplastic resin composition of the present invention into the vinyl chloride resin. The particle size of the cross-linked acrylic rubber (A) has relations with various properties of the intended vinyl chloride resin composition. In general, the cross-linked acrylic rubber having an average particle size of from 0.02 to 1.0$\mu$ is favorable in impact strength and tensile strength. However, a product having a high impact strength can be obtained and the object of the present invention is accomplished sufficiently even when the particle size of the cross-linked acrylic rubber is 0.2$\mu$ or less, if there is adopted a polymerization method in which the particle size of a cross-linked acrylic rubber is increased, for example, a polymerization method in which small amounts of polyvinyl alcohol, and an organic acid, an inorganic acid or an electrolyte are added. There can also be obtained a vinyl chloride resin composition having a high impact strength even if the cross-linked acrylic rubber (in the form of latex) is agglomerated, the rubber component is then dissolved in an aromatic vinyl chloride monomer and the graft copolymer obtained by bulk-polymerization or suspension-polymerization thereof is thereafter incorporated into the vinyl chloride resin. A small amount (30% by weight or less) of a polymerizable vinyl monomer may be copolymerized in the production of the cross-linked acrylic rubber. The term "vinyl monomer" used here means quite the same one as mentioned above.

When the thermoplastic resin of the present invention is used as a blending material for vinyl chloride resin, any proportions of the (A) component, i.e., the cross-linked acrylic rubber, the (B) component, i.e., the vinyl or vinylidene monomer, and the (C) component, i.e., the vinyl chloride resin powder in the graft copolymer may be selected, but in general, there are suitable from 70 to 10 parts by weight of the component (B), and 20 to 70 parts by weight of the component (C) per 30 to 90 parts by weight of the component (A). If the amount of the component (A) is too small, a favorable impact-resistance cannot be obtained unless a large amount of the graft copolymer formed is incorporated into the vinyl chloride resin, and, in the inverse case, the miscibility thereof with the vinyl chloride resin is deteriorated, and hence, sufficient kneading is required.

The components (B) and (C) show a tendency opposite to the case of the component (A).

The graft copolymer comprising components (A), (B) and (C) may be obtained by suspension polymerization, emulsion polymerization, solution polymerization or bulk-polymerization, or by a method in which both emulsion-polymerization and suspension-polymerization are used. Particularly effective is the last-mentioned polymerization method employing both emulsion-polymerization and suspension-polymerization.

The vinyl chloride resin composition obtained in accordance with the present invention may have incorporated thereinto pigments, anti-oxidants, ultraviolet-absorbers, lubricating agents, or plasticizers, if necessary.

The present invention is further explained referring to the following Examples, in which synthesis of rubber latex and graft copolymerization are illustrated in this order, and parts and % are by weight unless otherwise specified.

EXAMPLE 1

Synthesis of rubber latex

| | | | |
|---|---|---|---|
| A | Water | 800 | Parts |
| | Potassium persulfate | 2.0 | parts |
| | Sodium bisulfite | 0.2 | part |
| | Sodium oleate | 11.0 | parts |
| B | Butyl acrylate | 400 | parts |
| | Triacryl formal | 4.0 | parts |

Into a glass reactor were charged A and then B to form an emulsion, and the resulting emulsion was heated under a nitrogen stream at 60°C for 2 hours, and then at 70°C for an additional 3 hours to complete the polymerization. The polymer concentration in the resulting rubber latex was 33%.

Graft copolymerization

| | | | |
|---|---|---|---|
| A | PVC powder (Vinica 37L, produced by Mitsubishi Monsanto Co. Ltd.) | 100 | parts |
| B | Acrylic rubber latex obtained in the aforesaid synthesis of rubber latex | 135 | parts |
| C | Water | 400 | parts |
| | Polyvinyl alcohol | 3.2 | parts |
| D | Methyl methacrylate | 90 | parts |
| | Acrylonitrile | 60 | parts |
| | Styrene | 50 | parts |
| | Tertiary dodecylmercaptan | 1.5 | parts |
| | Lauroyl peroxide | 0.6 | parts |

Into a glass reactor were charged components B and C, and then A. The mixture was stirred to form a uniform mixture and composition D was then added thereto. Subsequently, the mixture was subjected to polymerization through emulsion polymerization under a nitrogen stream at 70°C for 2 hours, during which the emulsion was destroyed and hence 250 ml of a 0.2% aqueous solution of polyvinyl alcohol was added thereto and the mixture was stirred. Reaction was continued at 70°C for a further 3 hours in this state and then the reaction was further continued at 80°C for an additional 5 hours to complete polymerization. The polymer was dehydrated, and dried at 80°C to form a polymer powder. The powdery resin composition was shaped into pellets by means of an extruder at 200°C and test specimens were prepared therefrom by extrusion molding at 190°C. The mechanical properties, weather resistance and flame-resistance were examined on the test specimens to obtain the following results:

| | | |
|---|---|---|
| Impact strength (Izod) | 10.1 | kg-cm/cm$^2$ |
| Tensile strength | 520 | kg/cm$^2$ |
| Elongation | 21.1 | % |
| Flame-resistance | Self-extinguished. Fire-extinguishing time: 30 seconds. UL Standards 2. | |

This shaped product was placed outdoors for 3 months from Mar. 5, 1972 to June 4, 1972 at an angle of 45° facing the south (Hitachi City, Ibaragi Prefecture, Japan) and the result of this weather resistance test was as follows:

| | | |
|---|---|---|
| Impact resistance | 9.5 | kg-cm/cm$^2$ |
| Tensile strength | 480 | kg/cm$^2$ |
| Elongation | 20.0 | % |

The resin composition prepared according to the present invention showed almost no change in properties when examined in the outdoor exposure test and showed no change in lustre of the shaped resin surface.

EXAMPLE 2

Synthesis of rubber latex

A rubber latex was synthesized in the same manner as in Example 1.

Graft copolymerization

| | | | |
|---|---|---|---|
| A | Powder PVC (Vinica 37 L prepared by Mitsubishi Monsanto Co.) | 120 | parts |
| B | Acrylic rubber latex obtained in the above synthesis of rubber latex | 90 | parts |
| C | Water | 400 | parts |
| | Polyvinyl alcohol | 3.2 | parts |
| D | Methyl methacrylate | 45 | parts |
| | Acrylonitrile | 30 | parts |
| | Styrene | 75 | parts |
| | Tertiary dodecylmercaptan | 1.4 | parts |
| | Lauroyl peroxide | 0.6 | part |

Into a glass reactor were charged, first, components B and C, and then component A. The mixture was stirred to form a uniform mixture, to which composition D was added, and the resulting mixture was stirred for 30 minutes. Then the mixture was subjected to emulsion-polymerization at 70°C for 4 hours, during which the emulsion was destroyed and, therefore, 250 ml of a 0.2% aqueous solution of polyvinyl alcohol were added thereto and stirred. The reaction was continued for an additional 3 hours in this state and was further continued at 80°C for 5 hours to complete the polymerization. The polymer was dehydrated and dried at 80°C to form a polymer powder. The powdery resin composition was shaped into pellets by means of an extruder at 200°C and test specimens were prepared therefrom by extrusion-molding at 190°C. The mechanical properties, weather-resistance and flame-resistance were determined on the test specimens to obtain the following results:

| | | |
|---|---|---|
| Impact strength (Izod) | 8.4 | kg-cm/cm² |
| Tensile strength | 526 | kg/cm² |
| Elongation | 20.5 | % |
| Flame-resistance | Self-extinguished. Fire extinguishing time: 7.2 seconds | |

The shaped product was placed outdoors (Hitachi City, Ibaragi Prefecture, Japan) at an angle of 45° facing the south for 3 months (from Mar. 5, 1972 to June 4, 1972) to examine the weather-resistance. The results obtained were as follows:

| | | |
|---|---|---|
| Impact strength | 8.0 | kg-cm/cm² |
| Tensile strength | 428 | kg/cm² |
| Elongation | 20.1 | % |

EXAMPLE 3

Synthesis of rubber latex

| | | | |
|---|---|---|---|
| A | Water | 800 | parts |
| | Potassium persulfate | 2.0 | parts |
| | Sodium bisulfite | 0.2 | part |
| | Surface active agent (NX soap, a trade name of Kao Soap Co.) | 8.8 | parts |
| B | Butyl acrylate | 4.00 | parts |
| | Triacryl formal | 2.0 | parts |
| | Triacryl isocyanurate | 2.0 | parts |

Into a glass reactor were charged first composition A and then composition B to make an emulsion, and the mixture was heated under a nitrogen stream for 5 hours and then at 80°C for an additional 3 hours to complete the polymerization. The polymer concentration in the resulting rubber latex was 33%.

Graft copolymerization

| | | | |
|---|---|---|---|
| A | Powdery PVC | 50 | parts |
| B | Rubber latex obtained in said synthesis | 210 | parts |
| C | Water | 300 | parts |
| | Polyvinyl alcohol | 2.5 | parts |
| D | Methyl methacrylate | 30 | parts |
| | Acrylonitrile | 27 | parts |
| | Styrene | 43 | parts |

The solution and the monomer having the aforesaid composition were charged into a 4-necked glass flask and the mixture was stirred well to form an emulsion and then subjected to a graft-copolymerization in the same manner as in Examples 1 and 2. The polymer was dehydrated and dried at 70°C to make a polymer powder. The resulting graft-copolymer contained a large amount of the rubber component and was soft when used as such because the rubber component was contained in a large amount. The resin composition is suitable for use in admixture with other thermoplastic resins. A mixture of the resin composition with AS resin (styreneacrylonitrile copolymer resin) or methyl methacrylate resin was kneaded well on a roll at a temperature ranging from 155 to b 170°C and pressed to form a test specimen at 170°C. The mechanical properties and weather-resistance thereof were measured to obtain the results shown in Table 1.

Table 1

| Composition of the mixture (%) | | | Initial properties | | Properties after 3 months of exposure * | | |
|---|---|---|---|---|---|---|---|
| Copolymer resin composition obtained in Example 3 | AS resin | Methyl methaacrylate resin | Impact strength (kg-cm/cm²) | Tensile strength (kg/cm²) | Impact strength (kg-cm/cm²) | Tensile strength (kg/ cm² ) | Resin surface |
| 10 | 90 | — | 7.3 | 450 | 7.0 | 453 | Excellent surface lustre and no crack |
| 15 | 85 | — | 8.5 | 402 | 8.1 | 405 | " |
| 0 | 100 | — | 1.6 | 500 | 1.6 | 50 | " |
| 10 | — | 90 | 6.3 | 453 | 6.0 | 455 | " |
| 15 | — | 85 | 8.2 | 423 | 8.0 | 424 | " |
| 0 | — | 100 | 0.8 | 580 | 0.8 | 580 | " |
| ABS resin | | | 20.0 | 460 | 10.0 | 468 | No surface lustre, many cracks |

* Placed outdoors from March 5, 1972 to June 4, 1972 at an angle of 45° facing the south in Hitachi City, Ibaragi prefecture, Japan.

EXAMPLE 4

A. Preparation of cross-linked acrylic rubber

Into a glass reactor were charged 400 parts of water, 1 part of potassium persulfate, 0.1 part of sodium bisulfite and 4.4 parts of sodium oleate. Then, 200 parts of butyl acrylate and 0.5 part of triacryl formal were added thereto to form an emulsion, and the emulsion was heated under a nitrogen stream at 60°C for 5 hours and then at 80°C for an additional 3 hours to prepare an acrylic rubber.

B. Preparation of graft-copolymer

Vinyl chloride resin powder was suspended in the presence of the cross-linked acrylic rubber latex prepared in step (A), and methyl methacrylate, acrylonitrile and styrene were subjected to polymerization in the following manner.

Into a glass reactor were charged 200 parts of water, 0.3 part of potassium persulfate, 420 parts of the aforesaid cross-linked acrylic rubber latex and 1.0 part of polyvinyl alcohol. 100 parts of vinyl chloride resin powder was added thereto with stirring, and stirring was continued until the reaction system became uniform. 27.0 parts of methyl methacrylate, 18.0 parts of acrylonitrile, 15.0 parts of styrene, 0.73 part of tert-dodecylmercaptan and 0.3 part of benzoyl peroxide were added thereto, and the resulting mixture was stirred for 20 to 30 minutes and then polymerized by heating under a nitrogen stream at 70°C for 2 hours, during which the emulsion was destroyed. Hence, 200 parts of a 0.2% aqueous solution of polyvinyl alcohol were added to form a suspension system, and the mixture was subjected to polymerization by heating at 70°C for 3 hours and then at 80°C for an additional 2 hours to complete the polymerization. The resulting graft-copolymer was dehydrated and dried at 80°C after washing with water.

Subsequently, 100 parts of vinyl chloride resin (degree of polymerization: 1300) and a suitable amount of said graft-copolymer were admixed for 5 minutes in a Henschel mixer and molded by means of an extruder at a temperature of from 180° to 190°C. Said graft-copolymer and vinyl chloride had an excellent miscibility and gave a sheet-like material (Samples 1 to 3) having a smooth surface was extruded. The mechanical properties and weather-resistance were determined on these sheet-like materials. The results were as shown in Tables 2 and 3. Comparative Example 1 was obtained by incorporating into a vinyl chloride resin a graft copolymer obtained by grafting a vinyl monomer on the acrylic rubber, without using the vinyl chloride resin powder used in the preparation of a graft copolymer in Example 4. Comparative Example 2 was vinyl chloride resin alone free from the graph copolymer. Comparative Example 3 was a polymer obtained by incorporating an ABS graft copolymer into a vinyl chloride resin. The impact strength (Charpy impact strength) and the tensile strength in Tables 2 and 3 were measured according to JIS-6871 and JIS-6301, respectively, and the flow properties were measured by means of a KoKa type flow tester under the following conditions: load, 20 kg; nozzle size, 1 mmφ × 2 mm; and determination temperature, 190°C. The weather-resistance was determined by measuring various properties after exposure for a given time in a Sunshine type weather meter. The same was applied to the other Examples, too.

Table 2

| Specimens | Amount of graft copolymer incorporated (parts) | Impact strength (kg-cm/cm²) | Tensile strength (kg/cm²) | Flow property (× $10^{-3}$ cc/s) | Surface condition |
|---|---|---|---|---|---|
| No. 1 | 15 | 40 | 550 | 0.4 | Smooth |
| No. 2 | 10 | 32 | 585 | 0.5 | " |
| No. 3 | 5 | 25 | 592 | 0.8 | " |
| Comparative Example 1 | 15 | 12 | 390 | 2.0 | Not smooth |
| Comparative Example 2 | — | 2 | 600 | 0.2 | Smooth |
| Comparative Example 3 | 15 | 34 | 570 | 0.3 | " |

Table 3

(Weather-resistance)

| Specimens | Impact strength (kg-cm/cm²) 300 hours | Impact strength (kg-cm/cm²) 600 hours | Tensile strength (kg/cm²) 300 hours | Tensile strength (kg/cm²) 600 hours | Surface conditions 300 hours | Surface conditions 600 hours |
|---|---|---|---|---|---|---|
| No. 1 | 39 | 39 | 555 | 545 | Lustrous, no crack | Lustrous, no crack |
| No. 2 | 32 | 31 | 593 | 574 | " | " |
| No. 3 | 25 | 25 | 595 | 583 | " | " |
| Comparative Example 3 | 15 | 3.0 | 570 | 400 | A crack occurred | A crack occurred |

As is clear from Tables 2 and 3, the vinyl chloride resin compositions of the present invention obtained by mixing for 5 minutes which is the same as in Comparative Example 1 have a higher impact strength and a higher tensile strength, and the surface of the shaped product thereof is smooth. This fact means that the thermoplastic resin composition used in the present invention is readily miscible with the vinyl chloride resin. Comparative Example 2 is a vinyl chloride resin alone and inferior in impact resistance and tensile strength. Comparative Example 3 is excellent in mechanical properties, but inferior in weather-resistance.

EXAMPLE 5

A graft copolymer was prepared in the following manner from the cross-linked acrylic rubber latex prepared in Example 4.

Into a glass reactor were charged 130 parts of water and 210 parts of said acrylic rubber latex. With stirring to the reactor were further added 50 parts of methyl methacrylate, 10 parts of acrylonitrile, 10 parts of styrene, 0.4 part of tert-dodecylmercaptan, and 0.2 part of lauroyl peroxide, and the mixture was stirred to make uniform. Subsequently, 50 parts of a vinyl chloride resin powder was added thereto, and the mixture was stirred until it became uniform. Then, the mixture was subjected to emulsion polymerization under a nitrogen stream at 70°C for 2 hours, during which the emulsion was destroyed. Hence, a 0.2% aqueous solution of polyvinyl alcohol was added to form a suspension system, and the suspension was subjected to suspension polymerization at 70°C for 3 hours and at 80°C for an additional 3 hours to complete the polymerization. The resulting graft-copolymer was dehydrated and then dried at 80°C to produce a powder.

In the same manner as in Example 4, 100 parts of a vinyl chloride resin (degree of polymerization: 850)

and a suitable amount of the aforesaid graft-copolymer were admixed for 5 minutes in a Henschel mixer and shaped into a sheet by means of an extruder.

The mechanical properties and weather-resistance of the resulting sheet were as shown in Tables 4 and 5.

Table 4

| Amount of graft-copolymer incorporated (parts) | (Mechanical properties) Impact strength (kg-cm/cm²) | Tensile strength (kg/cm²) | Flow property (×10⁻³ cc/s) |
|---|---|---|---|
| 12 | 39 | 501 | 0.5 |
| 9 | 37 | 522 | 0.7 |
| 5 | 27 | 558 | 0.9 |

Table 5

| Amount of graft-copolymer incorporated (parts) | (Weather-resistance) Impact strength (kg-cm/cm²) | | Tensile strength (kg/cm²) | | Condition of the resin surface | |
|---|---|---|---|---|---|---|
| | 300 hours | 600 hours | 300 hours | 600 hours | 300 hours | 600 hours |
| 12 | 38 | 37 | 502 | 500 | Not changed | Not changed |
| 9 | 37 | 36 | 525 | 520 | " | " |
| 5 | 27 | 27 | 552 | 551 | " | " |

EXAMPLE 6

A. Preparation of cross-linked acrylic rubber

Into a glass reactor were charged 400 parts of water, 1 part of potassium persulfate, 0.1 part of sodium bisulfite, and 4.4 parts of sodium oleate, after which 170 parts of butyl acrylate, 30 parts of styrene, and 0.5 part of triacryl formal cross-linking agent were added to make an emulsion. The mixture was subjected to reaction under a nitrogen stream by heating at 60°C for 5 hours and then at 80°C for an additional 3 hours.

B. Preparation of graft-copolymer

Fine powder (having a particle size of $1\mu$ or less) of a vinyl chloride resin was suspended in the cross-linked acrylic rubber latex prepared in step (A), and methyl methacrylate, styrene and acrylonitrile were subjected to graft-polymerization in the following manner:

Into a glass reactor were charged 135 parts of water and, 206 parts of the cross-linked acrylic rubber latex, and then 40 parts of a 5% aqueous solution of polyvinyl alcohol. Powder of the vinyl chloride resin was added with stirring and, when the mixture became uniform, there were added 19.1 parts of methyl methacrylate, 5 parts of styrene, 2.2 parts of acrylonitrile, 0.38 part of tert-dodecylmercaptan and 0.1 part of benzoyl peroxide, and the mixture was then subjected to emulsion polymerization at 70°C under a nitrogen stream. Polymerization was continued for 2 hours, during which the emulsion was destroyed. Hence, 100 parts of a 0.2% aqueous solution of polyvinyl alcohol was added thereto to form a suspension system, and it was subjected to suspension polymerization at 70°C for 4 hours, at 80°C for an additional 2 hours and at 90°C for a further 2 hours to complete the polymerization. The resulting graft copolymer was dehydrated and then dried at 80°C and obtained in the powdery form.

In the same manner as in Example 4, 100 parts of a vinyl chloride resin (degree of polymerization: 1300) were admixed with a suitable amount of said graft copolymer for 5 minutes in a Henschel mixer and shaped into a sheet from an extruder. The mechanical properties and weather-resistance of the resulting sheet product were as shown in Tables 6 and 7.

Table 6

| Amount of graft-copolymer incorporated (parts) | (Mechanical properties) Impact strength (kg-cm/cm²) | Tensile strength (kg/cm²) | Flow property (× 10⁻³ cc/s) |
|---|---|---|---|
| 12 | 50 | 560 | 0.5 |
| 9 | 42 | 576 | 0.6 |
| 5 | 30 | 582 | 0.7 |

Table 7

| Amount of graft-copolymer incorporated (parts) | (Weather-resistanc) Impact strength (kg-cm/cm²) | | Tensile strength (kg/cm²) | | Condition of the resin surface | |
|---|---|---|---|---|---|---|
| | 300 hrs. | 600 hrs. | 300 hrs. | 600 hrs. | 300 hrs. | 600 hrs. |
| 12 | 49 | 50 | 563 | 559 | Not changed | Not changed |
| 9 | 42 | 41 | 570 | 564 | " | " |
| 5 | 30 | 30 | 583 | 567 | " | " |

What is claimed is:

1. A process for preparing a thermoplastic resin composition which comprises free radical copolymerizing (B) a polymerizable vinyl or vinylidene monomer onto (A) a cross-linked acrylic rubber obtained by copolymerizing a mixture consisting essentially of an acrylate represented by the general formula, $CH_2{=}CH{-}COOR$, wherein R is an alkyl group having 2 to 8 carbon atoms and a cross-linking agent, with (C) fine particles of a vinyl chloride resin being dispersed in said monomer during graft copolymerization to form a graft-copolymer of (A) and (B) and obtain a thermoplastic resin composition in which the vinyl chloride resin particles are uniformly dispersed in said graft-copolymer.

2. A process according to claim 1, wherein 20 to 70 parts by weight of the vinyl chloride resin is present in the reaction system per 100 parts by weight of a mixture of 10 to 90 parts by weight of the crosslinked acrylic rubber and 90 to 10 parts by weight of the vinyl monomer or vinylidene monomer.

3. A process according to claim 2, wherein the acrylate is selected from the group consisting of ethyl acrylate and butyl acrylate.

4. A process according to claim 2, wherein the vinyl monomer is at least one selected from the group consisting of styrene, acrylonitrile, methyl methacrylate, α-methylstyrene, and vinyltoluene.

5. A process according to claim 2, wherein the cross-linking agent is selected from the group consisting of triacryl formal, triallyl cyanurate and triallyl isocyanurate.

6. A process according to claim 2, wherein the particle size of the vinyl chloride resin is 1μ or less.

7. A process for preparing a vinyl chloride resin composition which comprises free radical polymerizing (B) a polymerizable vinyl or vinylidene monomer onto (A) a rubbery cross-linked acrylate copolymer obtained by copolymerizing a mixture consisting essentially of an acrylate represented by the general formula, $CH_2$=CH—COOR wherein R is an alkyl group having 2 to 8 carbon atoms and a cross-linking agent with (C) fine particles of a vinyl chloride resin being dispersed in said monomer during graft copolymerization, thereby obtaining a thermoplastic resin composition in which the vinyl chloride resin particles are uniformly dispersed in a graft-polymer of (A) and (B), isolating said composition from the reaction system, and admixing uniformly a vinyl chloride resin powder with said isolated composition.

8. A process according to claim 7, wherein 10 to 70 parts by weight of the vinyl chloride resin fine particles are present in the reaction system per 100 parts by weight of a mixture of 30 to 90 parts by weight of the cross-linked acrylate copolymer and 70 to 20 parts by weight of the vinyl monomer.

9. A process according to claim 8, wherein the acrylate is selected from the group consisting of ethyl acrylate and butyl acrylate.

10. A process according to claim 8, wherein the vinyl monomer is at least one monomer selected from the group consisting of styrene, acrylonitrile, methyl methacrylate, α-methylstyrene, and vinyltoluene.

11. A process according to claim 8, wherein the particle size of the vinyl chloride resin is 1μ or less.

12. A process for preparing a thermoplastic resin composition comprising effecting free radical copolymerization of a polymerizable composition comprising (A) 10 to 90 parts by weight of a cross-linked acrylic rubber obtained by copolymerizing an acrylate represented by the general formula $CH_2$=CH—COOR wherein R is alkyl having 2 to 8 carbon atoms with a cross-linking agent, (B) 90 to 10 parts by weight of a copolymerizable vinyl monomer or vinylidene monomer, the total amount of said acrylic rubber and said copolymerizable vinyl monomer or vinylidene monomer being 100 parts by weight, and (C) 20 to 70 parts by weight of particles of a vinyl chloride resin, said polymerization forming a graft-copolymer of said acrylic rubber and said vinyl monomer of vinylidene monomer grafter onto said acrylic rubber, whereby a thermoplatic resin composition in which vinyl chloride resin particles are dispersed in said graft-copolymer is obtained.

13. The process of claim 12, wherein said cross-linked acrylic rubber consists essentially of said acrylate and said cross-linking agent in polymerized form.

14. The process of claim 13, wherein said acrylate is selected from the group consisting of ethyl acrylate and butyl acrylate.

15. The process of claim 14, wherein said vinyl monomer or said vinylidene monomer is selected from the group consisting of styrene, acrylonitrile, methyl methacrylate, α-methylstyrene and vinyltoluene.

16. The process of claim 13, wherein said vinyl monomer or said vinylidene monomer is selected from the group consisting of styrene, acrylonitrile, methyl methacrylate, α-methylstyrene and vinyltoluene.

17. The process of claim 13, wherein said cross-linking agent is selected from the group consisting of triacryl formal, triallyl cyanurate and triallyl isocyanurate.

18. The process of claim 13, wherein the particle size of the vinyl chloride resin is 1μ or less.

19. The process of claim 13, wherein said particles of vinyl chloride resin are added to said composition in the form of a powder.

20. The process of claim 19, wherein said composition is formed by adding said particles of a vinyl chloride resin and said vinyl or vinylidene monomer to an aqueous latex of said acrylic rubber.

21. The process of claim 13, wherein said vinyl monomer or vinylidene monomer includes methyl methacrylate.

22. The process of claim 21, wherein said vinyl monomer or vinylidene monomer is a mixture of methyl methacrylate, acrylonitrile and styrene.

23. The process of claim 13, wherein the amount of cross-linking agent in said acrylic rubber is about 0.2 to 10% by weight.

24. The process of claim 13, wherein said mixture contains 70 to 10 parts by weight of said vinyl monomer or vinylidene monomer and 20 to 70 parts by weight of said particles of vinyl chloride resin for each 30 to 90 parts by weight of said acrylic rubber.

25. The process of claim 13, wherein said mixture is polymerized in the presence of water.

26. The process of claim 25, wherein polyvinyl chloride powder and said vinyl monomer or vinylidene monomer are added to an aqueous latex of said acrylic rubber, wherein the mixture so obtained is subjected to emulsion polymerization, and thereafter the mixture so obtained is subjected to suspension polymerization.

27. The process of claim 13, further comprising recovering said thermoplastic resin composition from the reaction system obtained upon graft-copolymerization and admixing said thermoplastic resin composition with a vinyl chloride resin.

28. The process of claim 27, wherein said thermoplastic resin composition is substantially uniformly mixed with a vinyl chloride resin powder.

29. The process of claim 28, wherein said acrylate is selected from the group consisting of ethyl acrylate and butyl acrylate.

30. The process of claim 28, wherein said vinyl monomer or said vinylidene monomer is selected from the group consisting of styrene, acrylonitrile, methyl methacrylate, α-methylstyrene and vinyltoluene.

31. The process of claim 28, wherein the particle size of the vinyl chloride resin is 1μ or less.

32. The process of claim 12, wherein said acrylate is selected from the group consisting of ethyl acrylate and butyl acrylate.

33. The process of claim 12, wherein said vinyl monomer or said vinylidene is selected from the group consisting of styrene, acrylonitrile, methyl methacrylate, α-methylstyrene and vinyltoluene.

34. The process of claim 12, wherein said crosslinking agent is selected from the group consisting of triacryl formal, triallyl cyanurate and triallyl isocyanurate.

35. The process of claim 12, further comprising recovering said thermoplastic resin composition from the reaction system obtained upon graft-copolymerization and admixing said thermoplastic resin composition with a vinyl chloride resin.

36. The process of claim 1, wherein said cross-linked acrylic rubber is in the form of particles having a particle size of about 0.02 to 1.0μ.

37. The process of claim 36, wherein the particle size of the vinyl chloride resin is 1μ or less.

38. The process of claim 7, wherein said cross-linked acrylic rubber is in the form of particles having a particle size of about 0.02 to 1.0μ.

39. The process of claim 38, wherein the particle size of the vinyl chloride resin is 1μ or less.

40. The process of claim 12, wherein said cross-linked acrylic rubber is in the form of particles having a particle size of about 0.02 to 1.0μ.

41. The process of claim 40, wherein the particle size of the vinyl chloride resin is 1μ or less.

42. The process of claim 1, wherein said fine particles of a vinyl chloride resin are added to said cross-linked acrylic rubber prior to graft copolymerization in the form of fine particles.

43. The process of claim 7, wherein said fine particles of a vinyl chloride resin are added to said cross-linked acrylic rubber prior to graft copolymerization in the form of fine particles.

44. The process of claim 12, wherein said particles of vinyl chloride resin are added to said composition in the form of particles.

45. The process of claim 1, wherein said acrylic rubber consists essentially of said acrylate and said cross-linking agent in polymerized form, and further wherein said particles of a vinyl resin consist essentially of polymerized polyvinyl chloride.

46. The process of claim 7, wherein said acrylic rubber consists essentially of said acrylate and said cross-linking agent in polymerized form, and further wherein said particles of a vinyl chloride resin consist essentially of polymerized polyvinyl chloride.

47. The process of claim 12, wherein said acrylic rubber consists essentially of said acrylate and said cross-linking agent in polymerized form, and further wherein said particles of a vinyl chloride resin consist essentially of polyvinyl chloride.

* * * * *